(12) United States Patent
Ali

(10) Patent No.: US 7,508,823 B2
(45) Date of Patent: *Mar. 24, 2009

(54) METHOD AND APPARATUS FOR HIGH-SPEED MULTIPLE CHANNEL AND LINE SELECTOR SWITCH

(75) Inventor: Mohammed Ershad Ali, Sunnyvale, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 975 days.

This patent is subject to a terminal disclaimer.

(21) Appl. No.: 10/837,338

(22) Filed: Apr. 30, 2004

(65) Prior Publication Data

US 2005/0243859 A1 Nov. 3, 2005

(51) Int. Cl.
*H04L 12/50* (2006.01)
*H04J 3/02* (2006.01)
*B23K 11/24* (2006.01)
(52) U.S. Cl. .................. 370/357; 370/537; 307/112
(58) Field of Classification Search ............... 370/357, 370/537; 307/112
See application file for complete search history.

(56) References Cited

U.S. PATENT DOCUMENTS

| | | | | |
|---|---|---|---|---|
| 3,470,333 A | * | 9/1969 | Schneider et al. | 200/11 EA |
| 3,665,365 A | * | 5/1972 | Hartman | 338/190 |
| 3,855,521 A | * | 12/1974 | Kiuchi | 323/346 |
| 4,139,817 A | * | 2/1979 | Boer et al. | 324/72.5 |
| 4,837,413 A | * | 6/1989 | Schwab et al. | 200/11 R |
| 5,153,391 A | * | 10/1992 | Dzung et al. | 200/11 R |
| 5,805,571 A | * | 9/1998 | Zwan et al. | 370/249 |
| 6,933,628 B2 | * | 8/2005 | Ali | 307/112 |

FOREIGN PATENT DOCUMENTS

JP 04068549 3/1992
JP 2002/311351 10/2002

\* cited by examiner

*Primary Examiner*—Firmin Backer
*Assistant Examiner*—Nittaya Juntima

(57) ABSTRACT

A high-speed multiple channel and line selector switch allows the simultaneous selection of the two lines of a differential channel and permits the simultaneous selection of multiple channels by introduction of the appropriate high speed pad connectivity.

20 Claims, 12 Drawing Sheets

METHOD AND APPARATUS FOR HIGH-SPEED MULTIPLE CHANNEL AND LINE SELECTOR SWITCH

BACKGROUND

In the emerging area of parallel and parallel coarse wavelength division multiplexing (CWDM) optical interconnects, the trend is to increase the number of channels per module while maintaining channel speed at a reasonable level as determined by the available device and integrated circuit technologies. For example, in one system, it may be desired to run a 48 channel module at a speed of up to 10 Gb/s. In such a module, channels are typically arranged into four groups of twelve with each group operating at a different wavelength. The testing and evaluation of a system having many high speed channels presents a problem. Extension of typical conventional approaches where each channel is handled separately requires a test configuration that uses a large number of high-speed cables, connectors, terminations, a large evaluation board and a considerable number of man-hours for testing and evaluation. Hence, it is desirable to transition from the typical conventional approach to a more integrated approach that, for example, uses compact on-board components allowing the selection of a subset of channels at the time of measurement while properly terminating the remaining channels. This allows a significant reduction in the number of high-speed cables and components needed, reducing the complexity of the test configuration. Central to such an integrated test approach is a switch that allows easy selection of one or more channels from a multiplicity of high speed channels.

A switch that allows easy channel selection is a high-speed channel selector switch (HCSS) as disclosed in U.S. Pat. No. 6,933,628 hereby incorporated by reference.

The HCSS typically consists of two units-stationary unit 100 and rotary 200 unit as shown in FIGS. 1 and 2, respectively. High speed channel pads 120 are distributed around circle 125 in a circular pattern and a high speed channel is electrically coupled to each of high speed channel pads 120. Rotary unit 200 has a pad frame that matches to stationary unit 100 resulting in a one to one mapping between outer pads 220 on rotary unit 200 and high speed channel pads 120 on stationary unit 100 when rotary unit 200 is properly mated to stationary unit 100. Placing conductive balls or bumps on stationary unit 100 allows high speed connections to be made. On rotary unit 200, all outer pads 220 except one are terminated to proper loads or impedances by short segments of transmission lines 250. The remaining outer pad 220 is electrically coupled to pad 240 at the center by transmission line 225. This allows selection of one channel while properly terminating all others to termination impedances 275. Note that portions 260 of rotary unit 200 are kept at ground. By rotating rotary unit 200 by the proper amount, any high speed channel is selectable.

However, the HCSS switch allows only one channel to be selected at a time and may be a problem for some test applications. For example, in applications that involve differential signaling and two lines, the use of the HCSS switch allows monitoring of only a single line at a time. Hence, monitoring both lines simultaneously is not possible with the use of one HCSS switch. Additionally, the mechanical tolerances required for the HCSS switch are not easily implemented. Because pads 140 and 240 are at the center of stationary unit 100 and rotary unit 200, respectively, alignment features such as an alignment pin cannot be located at the center. The mechanical housing typically has several parts, a rotary part, a stationary part and a clamping part. The inability to use the center for alignment of these parts typically degrades the stack-up tolerances. The mechanical housing functions to hold and lock the rotary unit with respect to the stationary unit and when unlocked the mechanical housing allows the rotation of the rotary unit in fixed increments. To allow large stack-up tolerances requires the use of larger pads 140 and 240 that degrade the high speed performance of the pads because of the increasing pad capacitance associated with increased pad size.

SUMMARY OF INVENTION

In accordance with the invention, eliminating the central high speed pad removes the constraint of single channel selection to allow the simultaneous selection of the two lines of a differential channel and permit the simultaneous selection of multiple channels by introduction of the appropriate high speed pad connectivity. Additionally, eliminating the need for a high speed pad at the center of rotary and stationary units by use of a High-speed Multiple Channel and Line Selector Switch (HMCSS) allows for smaller alignment tolerances between the rotary and stationary units.

DETAILED DESCRIPTION OF THE INVENTION

Figure 1:
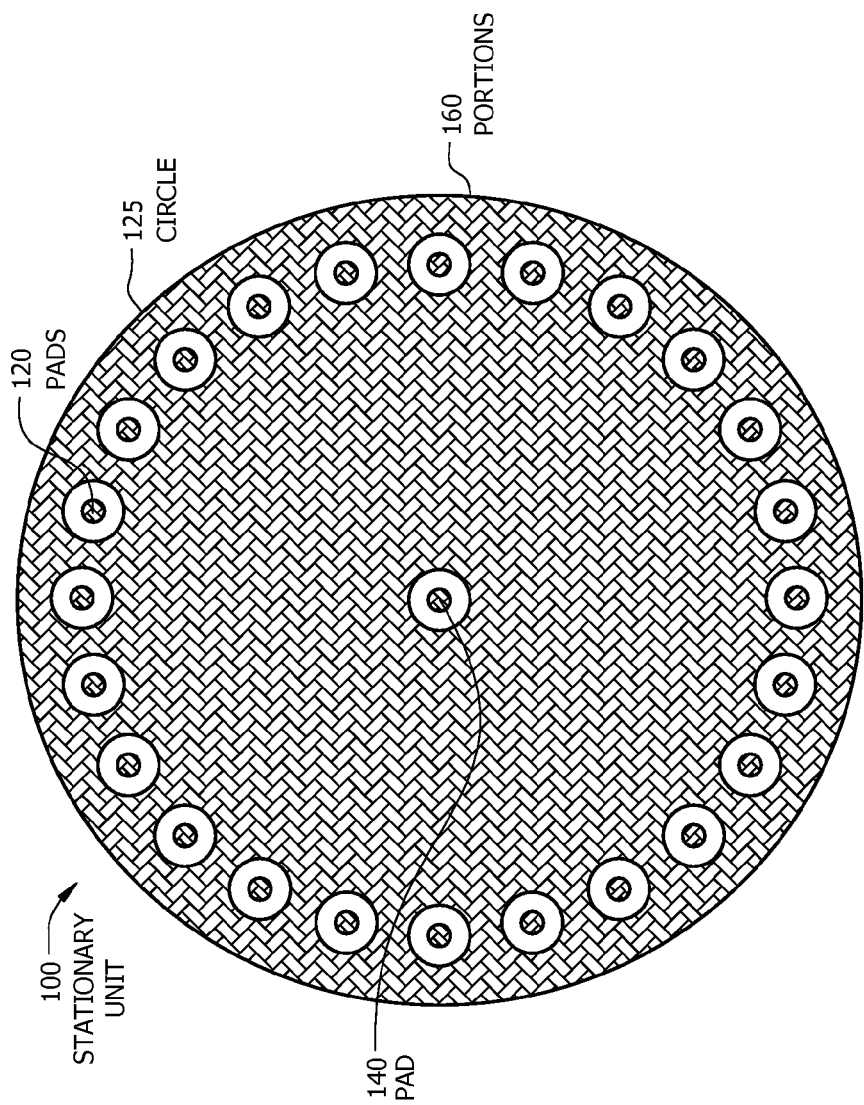
FIG. 1 shows a HCSS stationary unit from the prior art.
Figure 2:
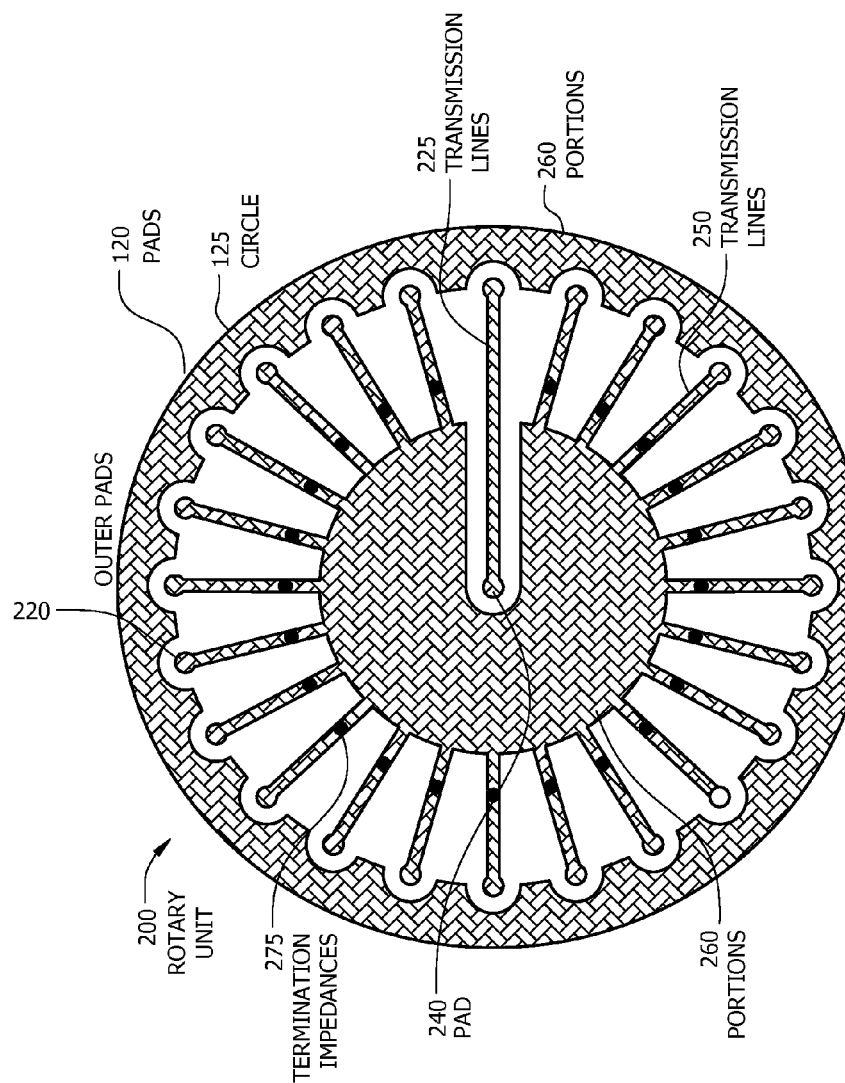
FIG. 2 shows a HCSS rotary unit from the prior art.
Figure 3A:
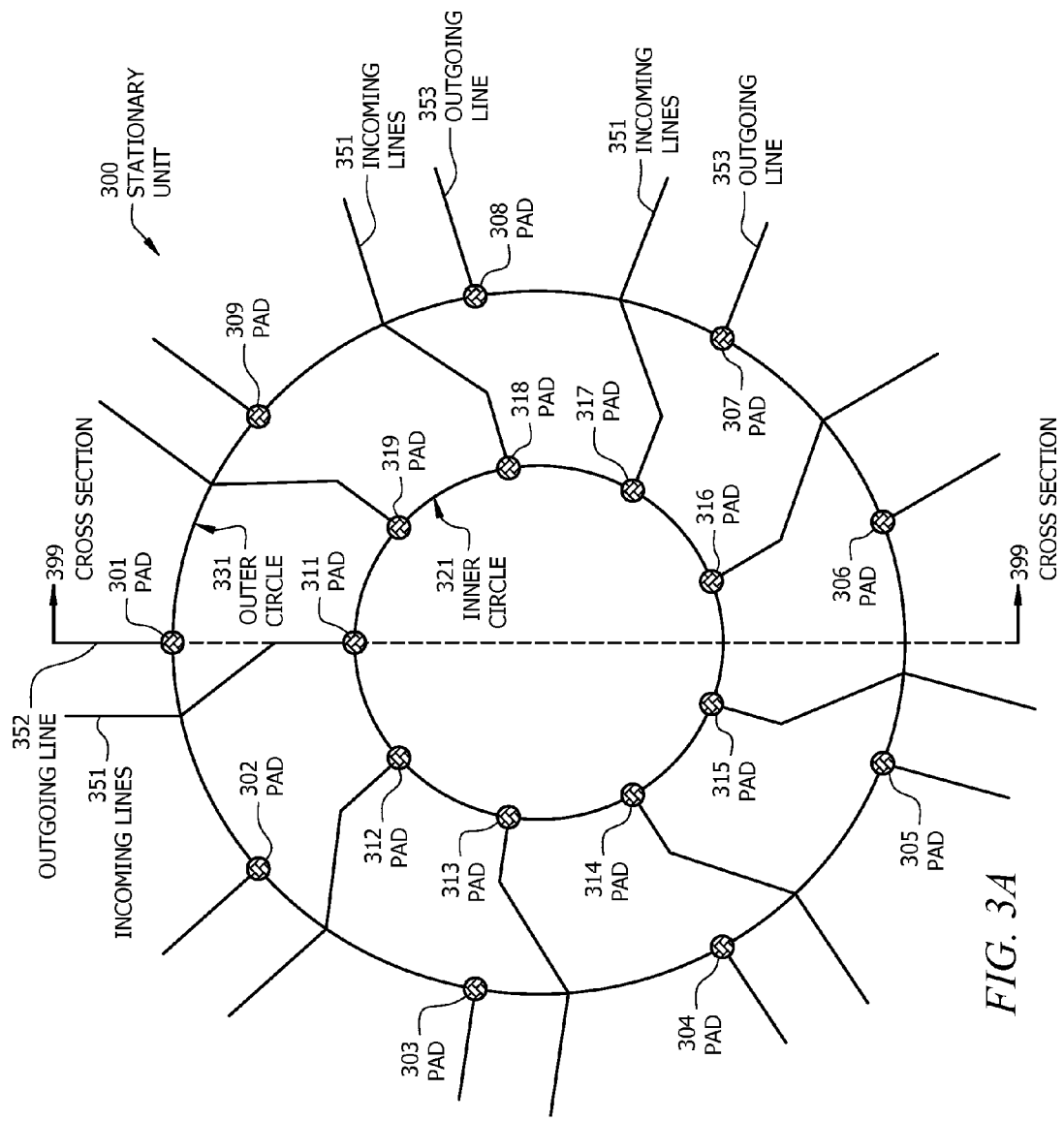
FIG. 3a shows an HMCSS stationary unit in an embodiment in accordance with the invention.

An embodiment in accordance with the invention is shown in FIG. 3a. HMCSS stationary unit 300 in FIG. 3a of HMCSS 450 (see FIG. 4b) is shown having nine incoming channels but the number of incoming channels may be more or less than nine. To simplify the discussion, the HMCSS in accordance with the invention is described in the context of choosing one or more lines from a plurality of incoming lines, however, the HMCSS also functions in reverse where one or more incoming lines are routed to lines selected from a plurality of outgoing lines.

With reference to FIG. 3a, each of the incoming channels is electrically coupled to one of high speed pads 311-319 of HMCSS stationary unit 300 by incoming lines 351. High speed pads 311-319 are typically uniformly distributed on inner circle 321 in a circular pattern. High speed pads 301-309 are typically uniformly distributed on outer circle 331 in a circular pattern. One of outer high speed pads 301-309, for example, high speed pad 301, is electrically coupled to the outgoing channel by outgoing line 352 while the remaining outer high speed pads, for example, high speed pads 302-309, are properly terminated to a load on outgoing lines 353. In accordance with an embodiment of the invention, any one of inner high speed pads 311-319 can be routed to high speed pad 301 while the remaining pads of inner high speed pads 311-319 is routed to one of remaining outer high speed pads 302-309.

Figure 3B:
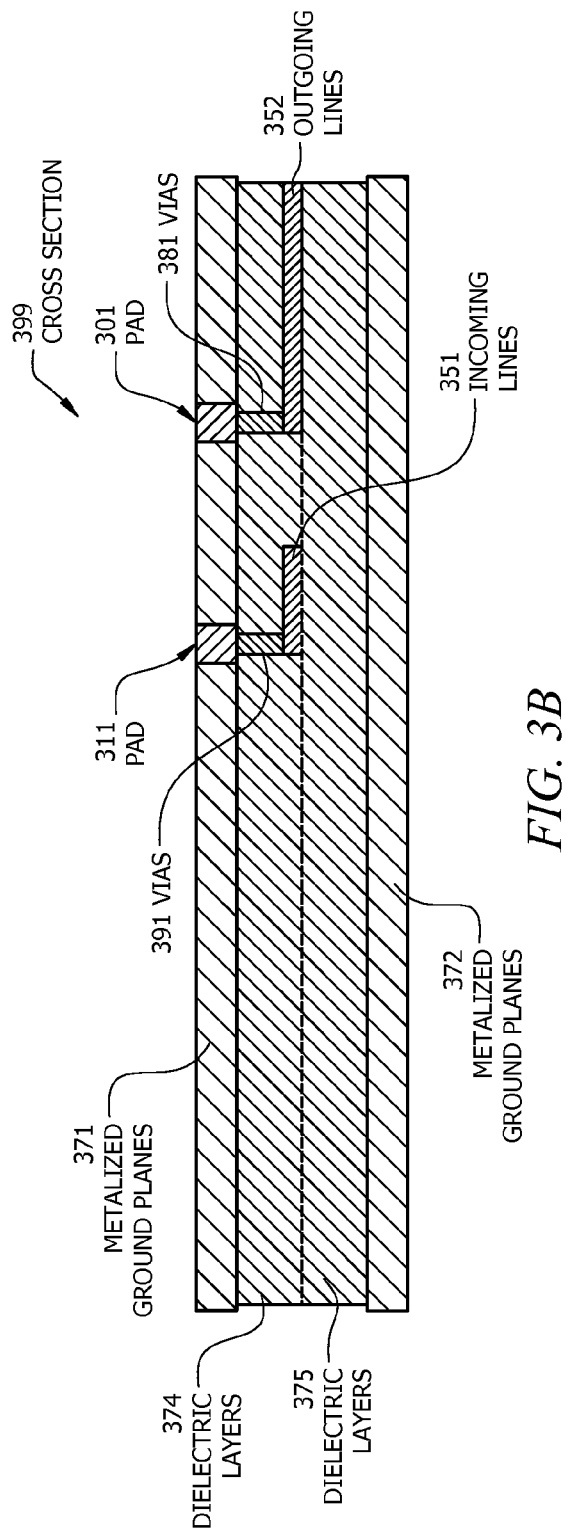
FIG. 3b shows a cross-section of an HMCSS stationary unit in an embodiment in accordance with the invention.

FIG. 3b shows cross-section 399 of HMCSS stationary unit 300. Dielectric layers 374 and 375 are sandwiched between metalized ground planes 371 and 372. Pads 311 and 301 are electrically coupled to incoming line 351 and outgoing line 352, respectively, by vias 391 and 381, respectively. Note that pads 311 and 301 are electrically isolated from ground plane 371.

Figure 4A:
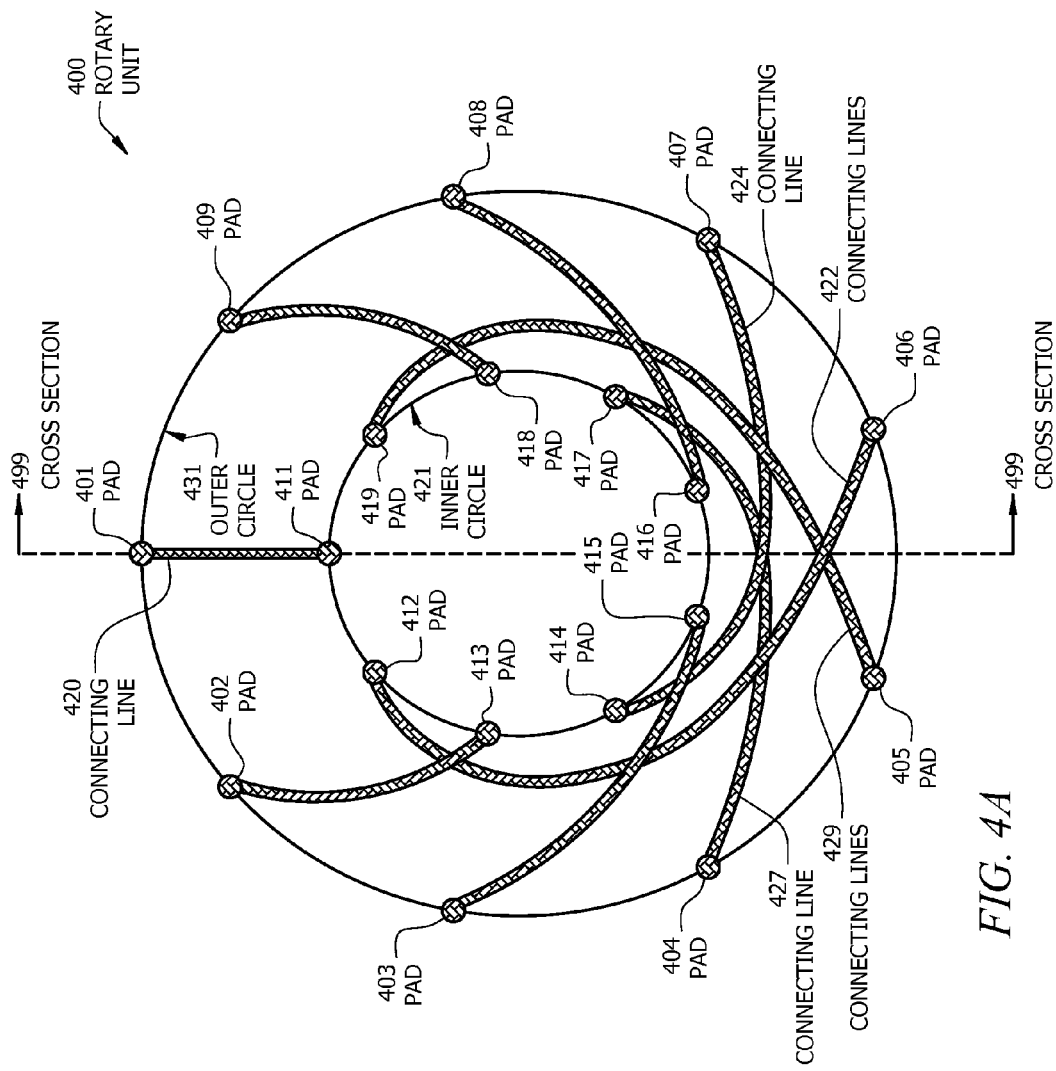
FIG. 4a shows an HMCSS rotary unit in an embodiment in accordance with the invention.

FIG. 4a shows two sets of high-speed pads, 401-409 and 411-419 of HMCSS rotary unit 400 typically distributed uniformly on outer circle 431 and inner circle 421 in a circular pattern, respectively. When HMCSS stationary unit 300 and HMCSS rotary unit 400 are properly aligned and mated, a one-to-one mapping exists between pads 301-309 and 311-319 on HMCSS stationary unit 300 and pads 401-409 and 411-419 on HMCSS rotary unit 400 for HMCSS 450 (see FIG. 4b).

In accordance with the invention, if inner high speed pads 411-419 of HMCSS rotary unit 400 of HMCSS 450 (see FIG. 4b) are electrically couple to outer high pads 401-409 of HMCSS rotary unit 400 shown in FIG. 4a, it is possible to obtain selective routing on HMCSS stationary unit 300 by rotation of HMCSS rotary unit 400. The electrical coupling that is needed between inner circle 421 and outer circle 431 to achieve this is shown in FIG. 4a. Inner high speed pads 411, 413, 415, 417 and 419 are electrically coupled to outer high speed pads 401, 402, 403, 404, 405, respectively, while inner high speed pads 412, 414, 416, 418 are electrically coupled to outer high speed pads 406, 407, 408, 409, respectively. The electrical connectivity required may be achieved by using, for example, a multilayer circuit board. The number of layers on the circuit board typically depends on the type of transmission lines used. For strip transmission lines, the minimum number of layers is typically five whereas for coplanar waveguides the minimum number of layers is typically two. The circuit board is typically made from glass-ceramic, ceramic, PTFE, polyimide, FR4 epoxy or similar materials.

HMCSS rotary unit 400 is attached to HMCSS stationary unit 300 such that all pads are mated. The start or 0 degree position of HMCSS rotary unit 400 is defined as the position when high speed pad 311 is aligned with high speed pad 41 land high speed pad 301 is aligned with high speed pad 401. In the start position, the incoming channel on high speed pad 311 is selected and routed to the outgoing channel on high speed pad 301. Rotating HMCSS rotary unit 400 in increments of 40 degrees clockwise from the 0 degree position selects the respective next incoming channel which is routed to the outgoing channel at high speed pad 301. The selection scheme is shown in Table 1 below:

TABLE 1

| Clockwise Rotation (degrees) | Pad Connectivity |
|---|---|
| 0 | 311→411→401→301 |
| 40 | 312→413→402→301 |
| 80 | 313→415→403→301 |
| 120 | 314→417→404→301 |
| 160 | 315→419→405→301 |
| 200 | 316→412→406→301 |
| 240 | 317→414→407→301 |
| 280 | 318→416→408→301 |
| 320 | 319→418→409→301 |

For example, taking a clockwise rotation of 240 degrees, pad 317 of HMCSS stationary unit 300 is aligned with high speed pad 414 of HMCSS rotary unit 400 and high speed pad 301 HMCSS stationary unit is aligned with pad 407 of HMCSS rotary unit 400 so that an electrical connection is established between high speed pad 317 and high speed pad 301. Although each 40 degree clockwise incremental rotation of HMCSS rotary unit 400 establishes a connection between one of inner high speed pads 311-319 to outer high speed pad 301, an electrical connection is also established between the remaining high speed pads on inner circle 321 to the remaining high speed pads on outer circle 331. Because outer high speed pads 302-309 are terminated to loads or impedances, the remaining incoming channels are properly terminated.

Figure 4B:
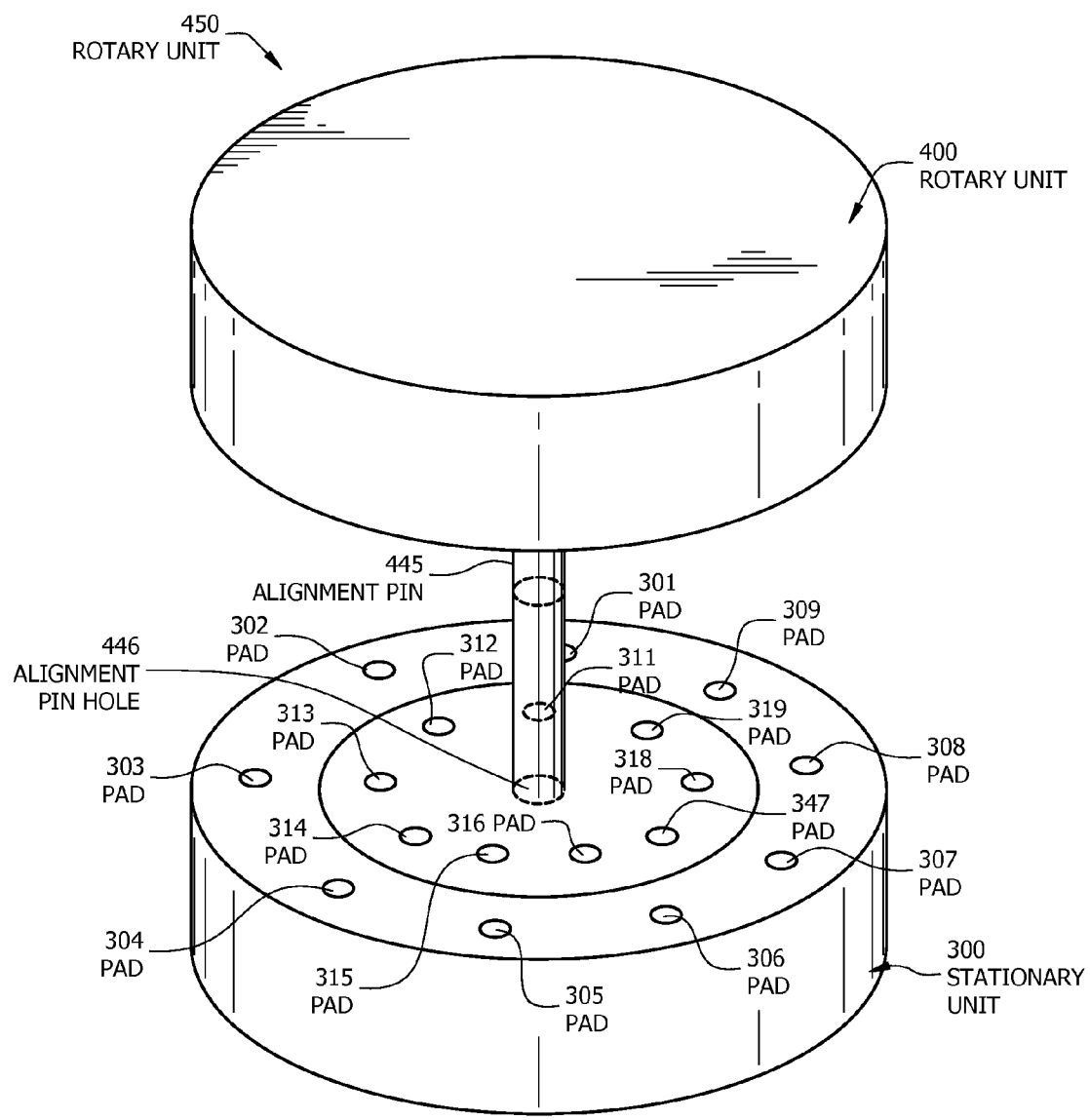
FIG. 4b shows an exploded view of an HMCSS unit in an embodiment in accordance with the invention.

Because neither HMCSS stationary unit 300 nor HMCSS rotary unit 400 has a high speed pad at the center, alignment pin 445 can be placed at the center as shown in FIG. 4b. The alignment tolerance is determined by the size and positional tolerances of alignment pin hole 446 and the alignment pin hole (not shown) in HMCSS rotary unit 400. A tolerance of less than 10 percent of the pad size can be typically achieved by using conventional techniques such as, for example, drilling or etching to make the alignment pin holes.

Figure 4C:
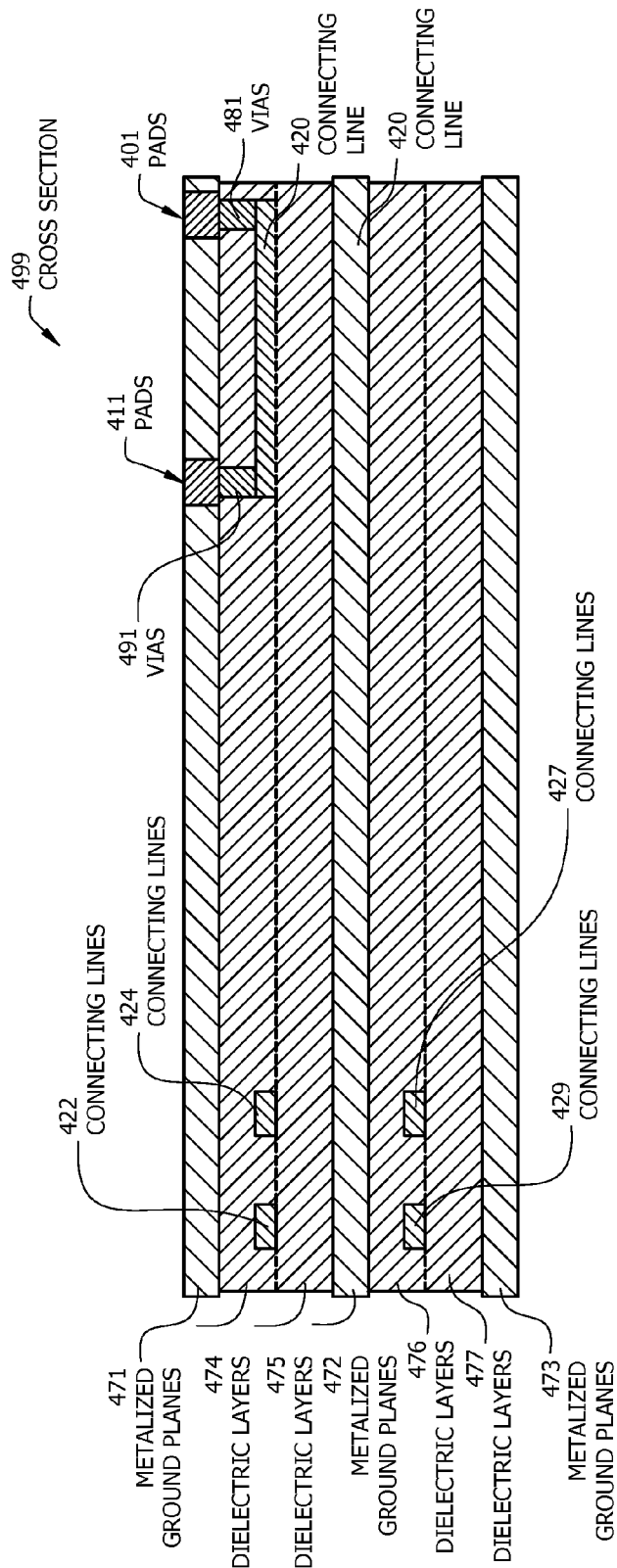
FIG. 4c shows a cross-section of an HMCSS rotary unit in an embodiment in accordance with the invention.

FIG. 4c shows cross-section 499 of HMCSS rotary unit 400. Dielectric layers 474 and 475 are sandwiched between metalized ground planes 471 and 472 while dielectric layers 476 and 477 are sandwiched between metalized ground planes 472 and 473. Pads 411 and 401 are electrically coupled to connecting line 420 by vias 491 and 481, respectively. Note that pads 411 and 401 are electrically isolated from ground plane 471. Connecting lines 422, 424 are located on dielectric layer 475 while connecting lines 429, 427 are located on dielectric layer 477 so that connecting line 422 may cross over connecting line 429 and connecting line 424 may cross over connecting line 427. In accordance with the invention, any connecting lines that cross in FIG. 4a are in different dielectric layers.

Figure 5:
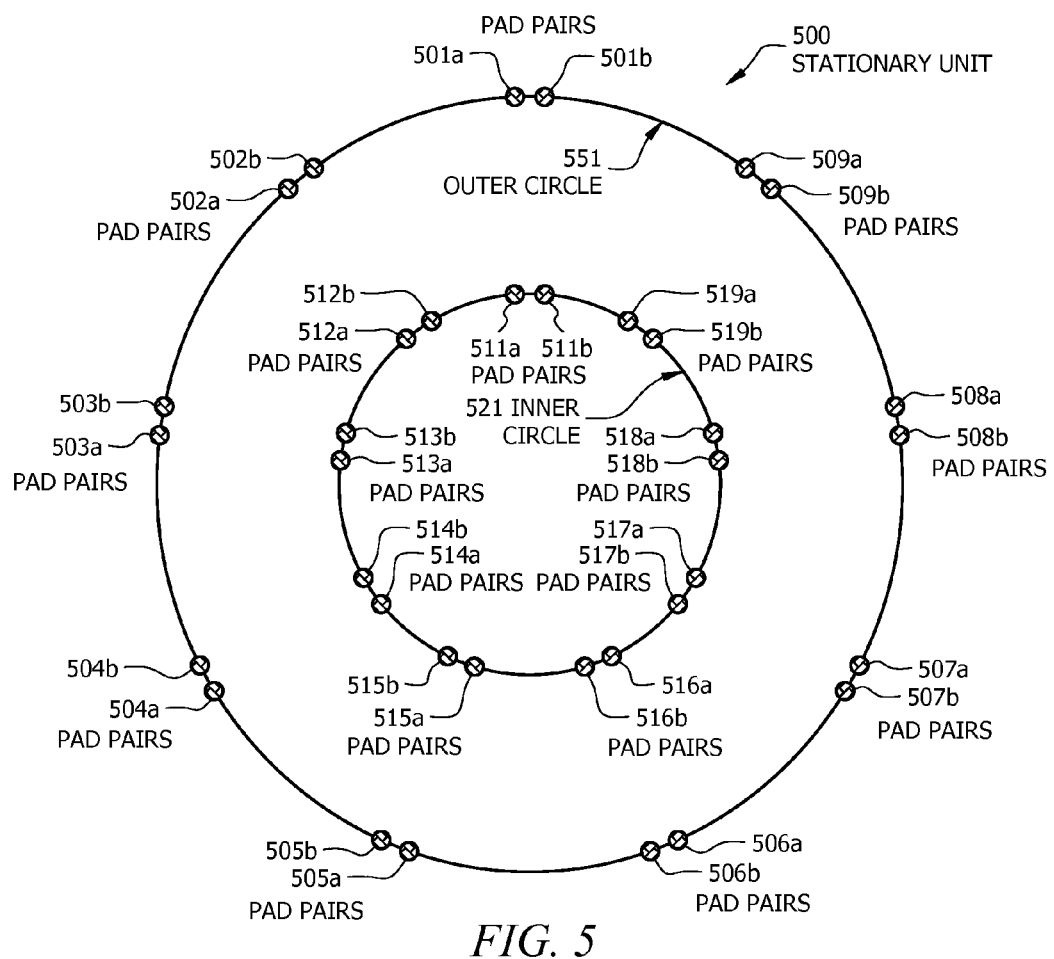
FIG. 5 shows an HMCSS stationary unit in an embodiment in accordance with the invention.
Figure 6:
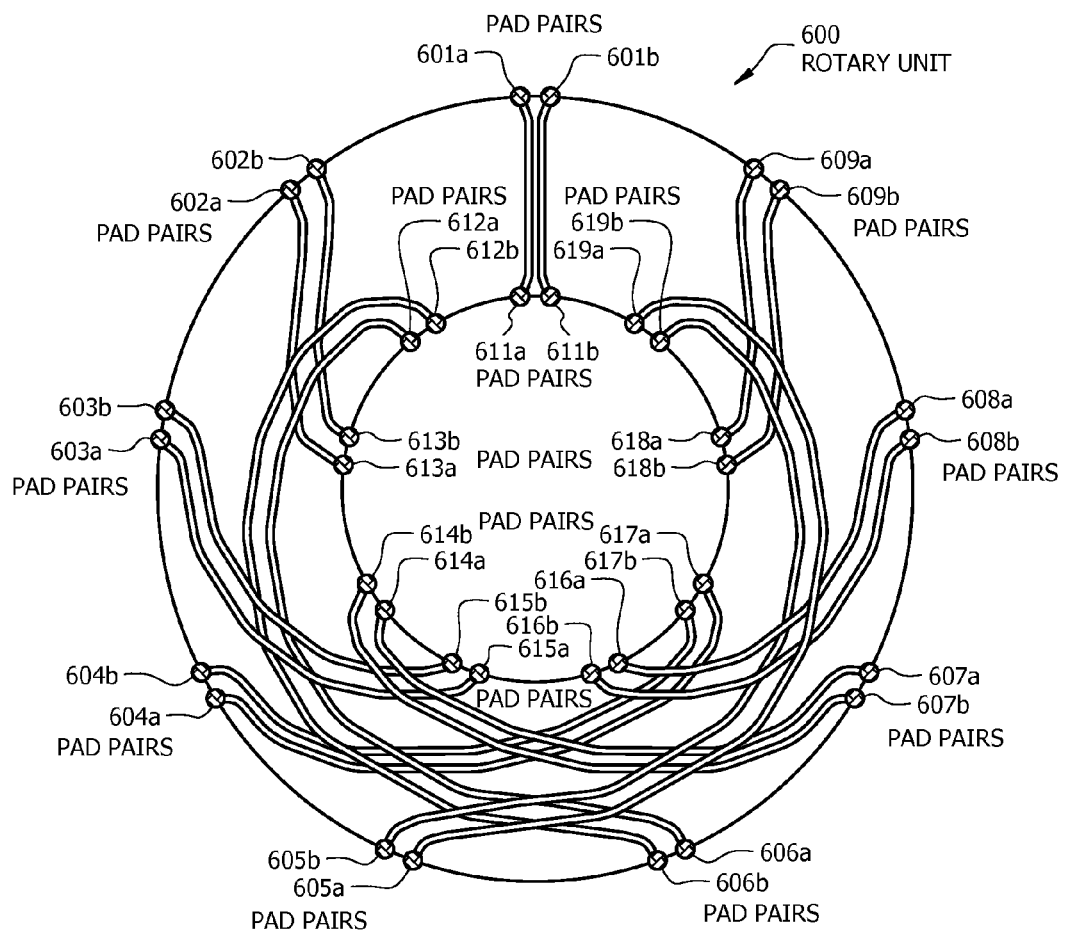
FIG. 6 shows an HMCSS rotary unit in an embodiment in accordance with the invention.

Furthermore, because no high speed pads are positioned at the center of HMCSS stationary unit 300 and HMCSS rotary unit 400, a differential channel switch configuration may be implemented. FIG. 5 shows differential HMCSS stationary unit 500 and FIG. 6 shows differential HMCSS rotary unit 600 where each high speed pad on HMCSS stationary unit 300 and HMCSS rotary unit 400 has been replaced by a pair of pads. On HMCSS stationary unit 500 in FIG. 5, high speed pad pairs 501a,b-509a,b replace high speed pads 301-309, respectively, while high speed pad pairs 511a,b- 519a,b replace high speed pads 311-319, respectively. On HMCSS rotary unit 600 in FIG. 6, high speed pad pairs 601a,b-609a,b replace high speed pads 401-409, respectively, while high speed pairs 611a,b-619a,b replace high speed pads 411-419, respectively.

In the above discussion, only one of the outer high speed pads in the HMCSS switch was electrically coupled to an outgoing channel while the remaining outer high speed pads are terminated to loads or impedances. However, the remaining outer high speed pads need not be terminated to a load. In accordance with an embodiment of the invention, a plurality of incoming channels may be selected. Multiple outer high speed pads may be electrically coupled to multiple inner high speed pads with the remaining high speed pads being terminated. For an embodiment in accordance with the invention, Table 2 shows an example of how two incoming channels may be selected at the same time with reference to FIGS. 3a and 4a.

TABLE 2

| Clockwise Rotation (degrees) | Pad Connectivity |
|---|---|
| 0 | 311→411→401→301 |
|  | 312→412→406→306 |

TABLE 2-continued

| Clockwise Rotation (degrees) | Pad Connectivity |
|---|---|
| 80 | 313→415→403→301 |
|  | 314→416→408→306 |
| 160 | 315→419→405→301 |
|  | 316→411→401→306 |
| 240 | 317→414→407→301 |
|  | 318→415→403→306 |
| 320 | 319→418→409→301 |
|  | 311→419→407→306 |
| 400 | 312→413→402→301 |
|  | 313→414→407→306 |
| 480 | 314→417→404→301 |
|  | 315→418→409→306 |
| 560 | 316→412→406→301 |
|  | 317→413→402→306 |
| 640 | 318→416→408→301 |
|  | 319→417→404→306 |

As shown in Table 2, high speed outer pads 301 and 306 are electrically coupled to the outgoing channels. By rotating rotary unit 400 in increments of 80 degrees the incoming channels may be selected.

In accordance with an embodiment of the invention, Table 3 shows the connectivity for the selection of three incoming channels at a time. In this embodiment, high speed outer pads 301, 306 and 302 are electrically coupled to the outgoing channels. By rotating rotary unit 400 in increments of 120 degrees the three incoming channels may be selected.

TABLE 3

| Clockwise Rotation (degrees) | Pad Connectivity |
|---|---|
| 0 | 311→411→401→301 |
|  | 312→412→406→306 |
|  | 313→413→402→302 |
| 120 | 314→417→404→301 |
|  | 315→418→409→306 |
|  | 316→419→405→302 |
| 240 | 317→414→407→301 |
|  | 318→415→403→306 |
|  | 319→416→408→302 |

Figure 7:
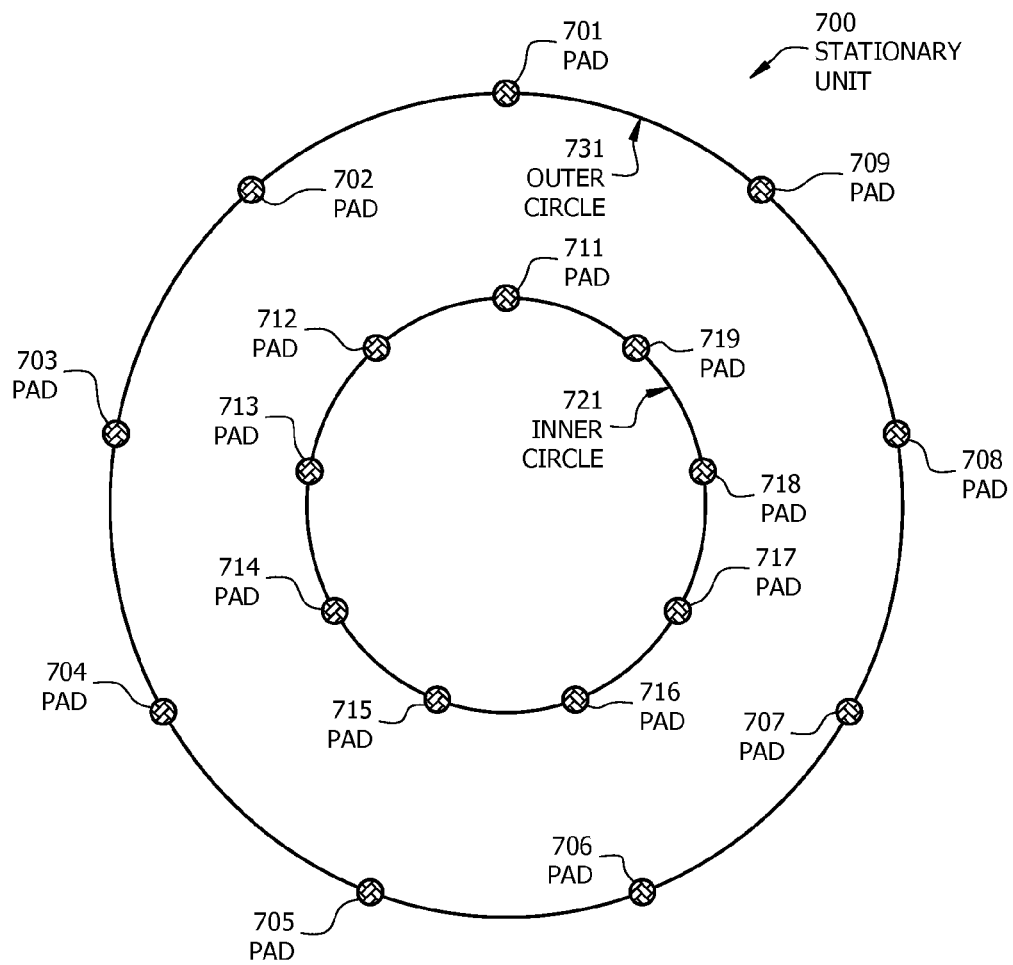
FIG. 7 shows an HMCSS stationary unit in an embodiment in accordance with the invention.
Figure 8:
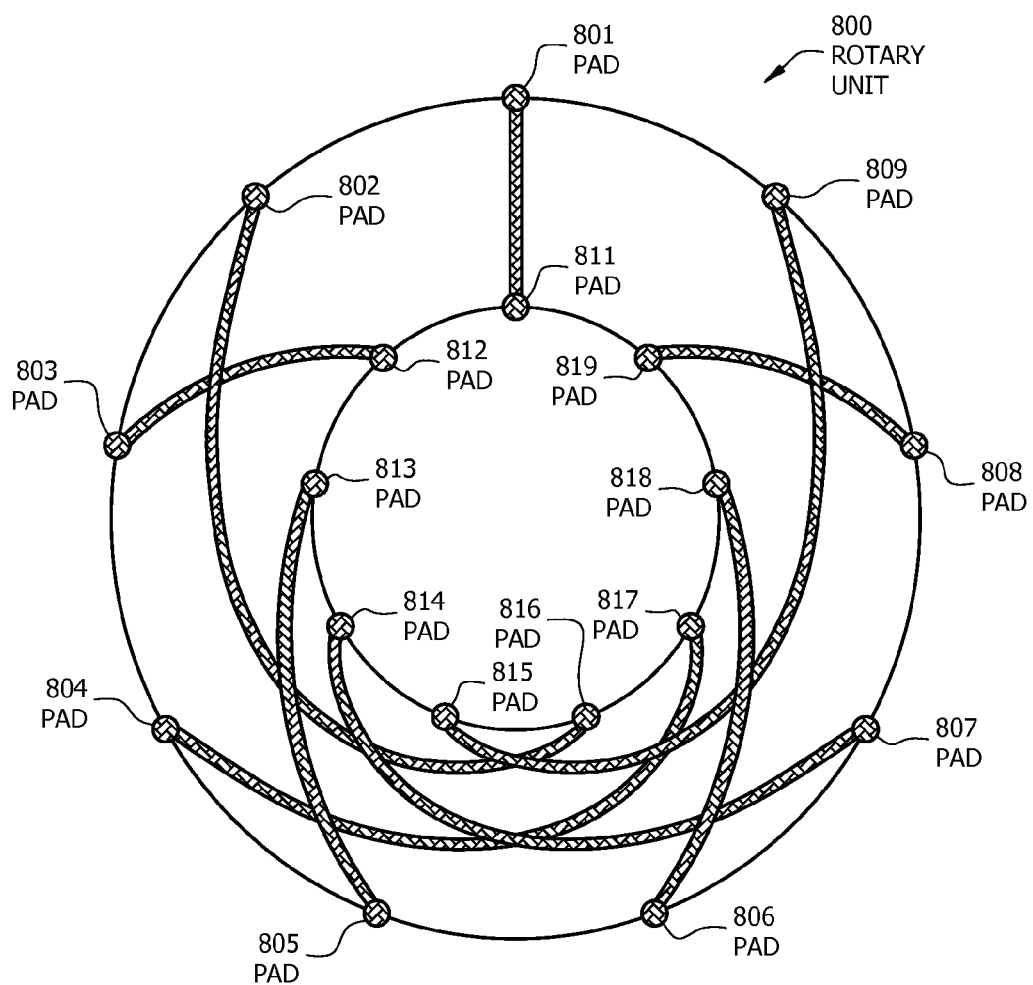
FIG. 8 shows an HMCSS rotary unit in an embodiment in accordance with the invention.

In the embodiments in accordance with the invention presented above, the incoming channels have been electrically coupled to high speed pads on inner circles 321 or 521 of HMCSS stationary unit 300 or 500, respectively while one or more high speed pads on outer circles 331 or 531 of HMCSS stationary unit 300 or 500, respectively are electrically coupled to outgoing channels. However, in accordance with the invention, the HMCSS switches may be configured so that the incoming channels are electrically coupled to high speed pads on outer circle 731 of stationary unit 700 and the outgoing channels are electrically coupled to high speed pads on inner circle 721 of stationary unit 700 of FIG. 7. FIG. 8 shows HMCSS rotary unit 800 with the required connectivity. High speed pads 801, 803, 805, 807 and 809 are electrically coupled to high speed pads 811, 812, 813, 814 and 815, respectively. High speed pads 802, 804, 806 and 808 are electrically coupled to high speed pads 816, 817, 818 and 819, respectively. Table 4 below shows the connectivity for the selection of one incoming channel at a time. High speed pad 711 is electrically coupled to the outgoing channel.

TABLE 4

| Clockwise Rotation (degrees) | Pad Connectivity |
|---|---|
| 0 | 701→801→811→711 |
| 40 | 702→803→812→711 |
| 80 | 703→805→813→711 |
| 120 | 704→807→814→711 |
| 160 | 705→809→815→711 |
| 200 | 706→802→816→711 |
| 240 | 707→804→817→711 |
| 280 | 708→806→818→711 |
| 320 | 709→808→819→711 |

Whereas the discussion so far has focused on the specific case of nine channels to illustrate embodiments in accordance with the invention, embodiments in accordance with the invention may have 2N+1 channels where N=1, 2, 3 .... For the rotary unit, such as, for example, rotary unit 400 where N=4, 2N+1, pairs of pads are evenly distributed on two circles of different radii, for example, circles 421 and 431. Both high speed pads of a pair, for example high speed pads 401 and 411, may lie on a radial line from the alignment pin hole of the rotary unit, for example, rotary unit 400 but in accordance with the invention there may be a fixed circumferential offset between the high speed pads of each pair as long as the high speed pads are evenly distributed on the two circles of different radii. The stationary unit, such as stationary unit 300, has 2N+1 pairs of matching high speed pads. Note that for stationary unit 300 and rotary unit 400, N=4. The requisite connectivity for 2N+1 pairs of high speed pads can be determined as follows. Label both the outer high speed pads and inner high speed pads consecutively from 1 to 2N+1, counterclockwise. Let j be the number for the outer high speed pad and k be the number for the inner high speed pad. Then in accordance with the invention, any outer pad j is uniquely electrically coupled to the inner high speed pad k where k=(2j-1) modulus 2N+1 or any inner high speed pad k is uniquely electrically coupled to the outer high speed pad j where j=(2k-1) modulus 2N+1. For example in FIG. 4a, assign j=1 ... 9 to high speed pads 401 ... 409, respectively and assign k=1 ... 9 to high speed pads 411 ... 419. Hence, in FIG. 4a, taking j=2 which corresponds to high speed pad 402, high speed pad 402 is electrically coupled to k=3 which corresponds to high speed pad 413.

The fixed rotation increment in degrees necessary to operate the HMCSS is an integer multiple of 360/(2N+1) degrees. As 2N+1 becomes larger, the size of the HMCSS increases to accommodate the added electrical connections. The required size for HMCSS can be determined from considerations of board layout and tolerances.

In accordance with the invention, if an even number of channels is desired, an extra channel is added to make the total number of channels an odd number and the extra channel is not used.

Figure 9:
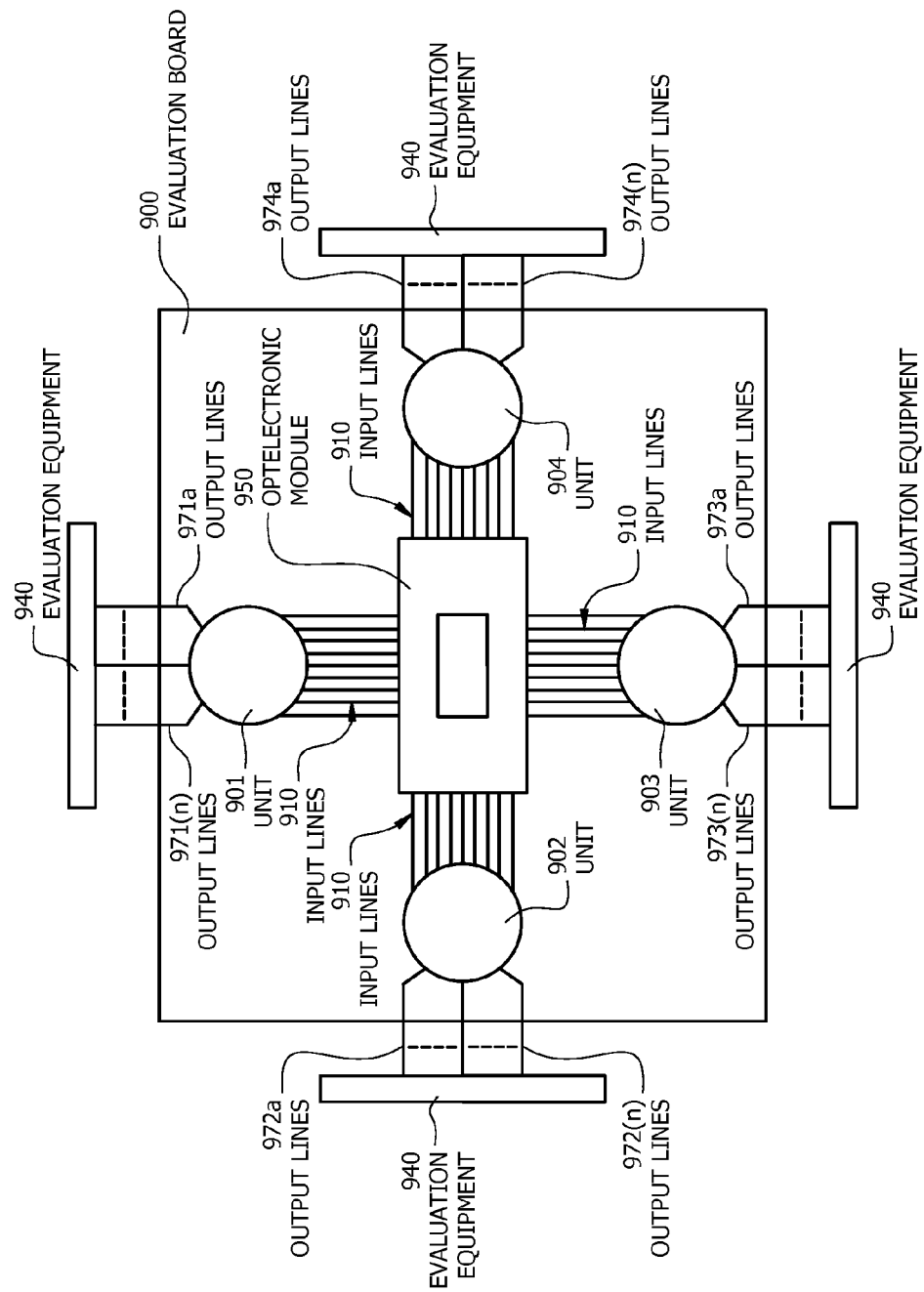
FIG. 9 shows an evaluation board in an embodiment in accordance with the invention.

FIG. 9 is a top view of evaluation board 900 for testing a device under test such as highly parallel optoelectronic module 950, for example a receiver or transmitter, in accordance with the invention. HMCSS units 901, 902, 903 and 904 are electrically coupled to optoelectronic module 950 using input lines 910. One or more output lines 971a-(n), 972a-(n), 973a-(n) and 974a-(n) provide one or more channels from HMCSS units 901, 902, 903 and 904, respectively, to evaluation equipment 940. In accordance with the invention, multiple channels may be simultaneously sampled from each HMCSS unit by evaluation equipment 940 while allowing rapid switching between channel configurations.

While the invention has been described in conjunction with specific embodiments, it is evident to those skilled in the art that many alternatives, modifications, and variations will be apparent in light of the foregoing description. Accordingly, the invention is intended to embrace all other such alternatives, modifications, and variations that fall within the spirit and scope of the appended claims.

The invention claimed is:

1. A high-speed multiple channel and line selector switch comprising:
   a first unit comprising a first plurality of contacts operable to electrically couple to a first plurality of incoming lines from a device under test, said first unit further comprising a second plurality of contacts operable to electrically couple to a second plurality of outgoing lines; and
   a second unit operable to selectively electrically couple selected ones of said first plurality of contacts to selected ones of said second plurality of contacts and further electrically couple unselected ones of said first plurality of contacts to a plurality of respective termination impedances such that selected ones of said first plurality of incoming lines are coupled to selected ones of said second plurality of outgoing lines and said unselected incoming data lines are electrically coupled to said plurality of termination impedances.

2. The high-speed multiple channel and line selector switch of claim 1 wherein said second unit is a rotary unit capable of rotation with respect to said first unit.

3. The high-speed multiple channel and line selector switch of claim 1 wherein said first plurality of contacts is configured in a first circular pattern and said second plurality of contacts is configured in a second circular pattern such that said first and said second circular patterns are concentric.

4. The high-speed multiple channel and line selector switch of claim 3 wherein the center of said first and said second circular patterns has a hole to receive an alignment pin.

5. The high-speed multiple channel and line selector switch of claim 2 wherein said rotary unit is operable to be rotated in fixed increments to electrically couple selected ones of said first plurality of contacts to selected ones of said second plurality of contacts and further electrically couple unselected ones of said first plurality of contacts to a plurality of respective termination impedances such that selected ones of said first plurality of incoming lines are coupled to selected ones of said second plurality of outgoing lines and said unselected incoming data lines are electrically coupled to said plurality of termination impedances.

6. The high-speed multiple channel and line selector switch of claim 1 wherein said first plurality of contacts and said second plurality of contacts are arranged in pairs such that said high-speed multiple channel and line selector switch is operable as a differential channel switch.

7. The high-speed multiple channel and line selector switch of claim 3 wherein said first circular pattern has a larger radius than said second circular pattern.

8. The high-speed multiple channel and line selector switch of claim 2 wherein said rotary unit is comprised of a multi-layer circuit board.

9. The high-speed multiple channel and line selector switch of claim 2 wherein said rotary unit comprises 2N+1 contacts arranged in a third circular pattern and 2N+1 contacts arranged in a fourth circular pattern such that said third and fourth circular patterns are concentric, wherein N is a positive integer that is greater than zero.

10. The high-speed multiple channel and line selector switch of claim 9 such that the electrical connectivity of said 2N+1 contacts in said third circular pattern to said 2N+1 contacts in said fourth circular pattern is determined by an equation $j=k$ modulus $2N+1$ where j and k are integer labels for said 2N+1 contacts in said third circular pattern and in said fourth circular pattern, respectively.

11. The high-speed multiple channel and line selector switch of claim 10 wherein $N=4$.

12. An evaluation board comprising:
    a first plurality of incoming lines operable to electrically couple to a device under test;
    a second plurality of outgoing lines; and
    a high-speed multiple channel and line selector switch comprising:
       a first unit comprising a first plurality of contacts operable to electrically couple to said first plurality of incoming lines, said first unit further comprising a second plurality of contacts operable to electrically couple to said second plurality of outgoing lines; and
       a second unit operable to selectively electrically couple selected ones of said first plurality of contacts to selected ones of said second plurality of contacts and further electrically couple unselected ones of said first plurality of contacts to a plurality of respective termination impedances such that selected ones of said first plurality of incoming lines are coupled to selected ones of said second plurality of outgoing lines and said unselected incoming data lines are electrically coupled to said plurality of termination impedances.

13. The high-speed multiple channel and line selector switch of claim 12 wherein said first plurality of contacts is configured in a circular pattern.

14. A method for making a high-speed multiple channel and line selector switch comprising:
    providing a first unit comprising a first plurality of contacts operable to electrically couple to a first plurality of incoming lines from a device under test, said first unit further comprising a second plurality of contacts operable to electrically couple to a second plurality of outgoing lines; and providing a second unit operable to selectively electrically couple selected ones of said first plurality of contacts to selected ones of said second plurality of contacts and further electrically couple unselected ones of said first plurality of contacts to a plurality of respective termination impedances such that selected ones of said first plurality of incoming lines are coupled to selected ones of said second plurality of outgoing lines and said unselected incoming data lines are electrically coupled to said plurality of termination impedances.

15. The method of claim 14 wherein said second unit is a rotary unit capable of rotation with respect to said first unit.

16. The method of claim 14 wherein said first plurality of contacts is configured in a first circular pattern and said second plurality of contacts is configured in a second circular pattern such that said first and said second circular patterns are concentric.

17. The method of claim 16 wherein the center of said first and said second circular patterns has a hole to receive an alignment pin.

18. The method of claim 14 wherein said first plurality of contacts and said second plurality of contacts are arranged in pairs such that said high-speed multiple channel and line selector switch is operable as a differential channel switch.

19. The method of claim 15 wherein said rotary unit comprises 2N+1 contacts arranged in a third circular pattern and 2N+1 contacts arranged in a fourth circular pattern such that said third and fourth circular patterns are concentric, wherein N is a positive integer that is greater than zero.

20. The method of claim 19 such that the electrical connectivity of said 2N+1 contacts in said third circular pattern to said 2N+1 contacts in said fourth circular pattern is determined by an equation j=k modulus 2N+1 where j and k are integer labels for said 2N+1 contacts in said third circular pattern and in said fourth circular pattern, respectively.

* * * * *

UNITED STATES PATENT AND TRADEMARK OFFICE
CERTIFICATE OF CORRECTION

| | | |
|---|---|---|
| PATENT NO. | : 7,508,823 B2 | Page 1 of 1 |
| APPLICATION NO. | : 10/837338 | |
| DATED | : March 24, 2009 | |
| INVENTOR(S) | : Mohammed Ershad Ali et al. | |

It is certified that error appears in the above-identified patent and that said Letters Patent is hereby corrected as shown below:

Column 1, Line 4,
insert --STATEMENT REGARDING FEDERALLY SPONSORED RESEARCH OR DEVELOPMENT The U.S. Government has a paid-up license in this invention and the right in limited circumstances to require the patent owner to license others on reasonable terms as provided for by the terms of contract no. MDA 972-03-3-004 awarded by the Defense Advanced Research Projects Agency (DARPA) of the US--.

Column 7, Line 27, Claim 2, delete "claim 1" and insert --claim 1--.

Signed and Sealed this
Twenty-eighth Day of December, 2010

David J. Kappos
*Director of the United States Patent and Trademark Office*